(12) United States Patent
Cochran et al.

(10) Patent No.: US 8,527,603 B2
(45) Date of Patent: Sep. 3, 2013

(54) IN-SYSTEM MEMORY PERSONALIZATION

(75) Inventors: William H. Cochran, Rochester, MN (US); Richard B. Finch, New Paltz, NY (US); Michael J. MacPherson, Elgin, MN (US); James A. O'Connor, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 11/615,135

(22) Filed: Dec. 22, 2006

(65) Prior Publication Data

US 2008/0155072 A1    Jun. 26, 2008

(51) Int. Cl.
*G06F 15/177*    (2006.01)

(52) U.S. Cl.
USPC .............................. 709/212; 709/222; 326/8

(58) Field of Classification Search
USPC ...................... 709/212, 222; 326/8
See application file for complete search history.

(56) References Cited

U.S. PATENT DOCUMENTS

| | | | |
|---|---|---|---|
| 5,530,753 A | 6/1996 | Easter et al. | |
| 2002/0165906 A1 | 11/2002 | Ricart et al. | |
| 2003/0142828 A1 | 7/2003 | Tuoriniemi et al. | |
| 2004/0133709 A1 | 7/2004 | Boehm et al. | |
| 2006/0200262 A1* | 9/2006 | Dyer | 700/117 |
| 2007/0024316 A1* | 2/2007 | Dellow | 326/8 |
| 2007/0157000 A1* | 7/2007 | Qawami et al. | 711/170 |

* cited by examiner

*Primary Examiner* — Liangche A Wang
*Assistant Examiner* — Cheikh Ndiaye
(74) *Attorney, Agent, or Firm* — Scully, Scott, Murphy & Presser PC; John E. Campbell

(57) ABSTRACT

A method and system for personalizing a plurality of parts are disclosed. All of these parts have an identical part number and one or more programmable functions. The method comprises the steps of employing in a first product a first of said parts; and employing in a second product, a second of said parts. Prior to normal operation of the first product, a first code is set in the first part, and this first code causes the first part to provide a first programmable function during normal operation of the first product. Prior to normal operation of the second product, a second code is set in the second part, and this second code causes the second part to provide a second programmable function during normal operation of the second product. The said second programmable function is different from the first programmable function.

17 Claims, 4 Drawing Sheets

IN-SYSTEM MEMORY PERSONALIZATION

BACKGROUND OF THE INVENTION

1. Field of the Invention

This invention generally relates to personalization of computer parts. More specifically, the preferred embodiment of the invention relates to a manufacturing system in which parts composed of common hardware but having unique microcode and vital product data do not require unique part numbers.

2. Background Art

Manufacturers have sought to leverage common parts to help reduce overall business costs and improve Return on Investment (ROI). One strategy strives to maintain brand-unique features and functions and thus the revenue associated with each brand, while leveraging common parts. Servers today are designed using more common under-the-cover industry standard parts. Both server hardware and microcode are designed as common building blocks wherever possible. The individual characteristics and functions in each operating system are used to maintain brand-unique customer value and investment protection. The adoption of a common parts strategy is driven by the need to remain profitable in an increasingly competitive marketplace. As high-performance hardware components, memory, hard disk drives (HDDs) and even processors become more widely available from multiple sources, they enable our competitors to become lower cost producers. The lower costs and business model efficiency gained through a common parts strategy provide a significant competitive advantage and therefore may not be simply a good idea, but a business imperative in the face of lower-cost industry-standard parts and reduced profit margins.

Over time, the computer industry has continued to use more common hardware in an effort to drive down development expense and other costs. Nevertheless, different companies and individual brands seek to provide product differentiation and unique functionality to attract customers and offer added value of competitors. These unique functions are increasingly implemented with brand unique microcode and Vital Product Data (VPD). When this unique code is implemented in brand unique models and featureable hardware, it can be enabled and utilized by the brand unique operating systems and applications to provide enhanced functionality and unique capabilities not available on other platforms. This facilitates brands to utilize more off-the-shelf common hardware yet still provide brand unique value-add functionality, which can allow them to command higher prices for similar features.

Vital Product Data (VPD) is information stored in nonvolatile storage in a computer, in a subsystem in a computer, or in a device in a computer that describe the element on which it resides. VPD can include common data such as part number, manufacturer, serial number, and features as well as unique company-defined and user defined data and functions. VPD is normally accessible by the computer in which the devices reside or by a network an external device.

Unique microcode and VPD can be loaded into common hardware by a part supplier in their manufacturing process to personalize the part, enable or disable functions and to assign a unique part number to these common parts event though the underlying hardware is exactly the same. This can result in dozens of part numbers associated with a common piece of hardware, all of which have to be ordered and stocked in manufacturing, increasing end-to-end costs such as inventory, scrap, and stocking of field spare parts. Additionally, it is common to have different levels of VPD and microcode co-exist simultaneous as a result of engineering changes. This again adds to the total number of unique parts that needs to be controlled and managed even though the underlying hardware is exactly the same. Changing the unique microcode and VPD may requires physically shipping the part back to the supplier and having the supplier rewrite the microcode and VPD, restamp a new PN and ship the part back to the server manufacturer for use in the systems they provide. This results in long delays and can mean missing product ship date and impact quarterly revenue especially during peak volume periods. There is normally added cost from the supplier to re-personalize and change parts for the box manufacturer.

Large manufacturing operations can have tens of thousands of unique part numbers (PNs) to manage. It is often difficult if not impossible even with the state-of-the art logistic systems to quickly identify parts that have common hardware yet different microcode and VPD. It is not uncommon for manufacturing operations to have parts constrained during peak period. Parts shortages can result even though they may have sufficient supply on hand of a part composed of the exact same hardware, but with unique microcode and VPD. A system allowing the rapid identification and re-personalization of common hardware through rewriting of unique microcode and VPD would significantly reduce peak demand parts shortages.

SUMMARY OF THE INVENTION

An object of this invention is to provide an improved method and system for personalizing computer parts.

Another object of the invention is to allow the rapid identification and re-personalization of common computer hardware parts.

A further object of the present invention is to provide a manufacturing system in which parts composed of common hardware but having unique microcode and vital product data do not require unique part numbers.

These and other objectives are attained with a method and system for personalizing a plurality of parts, all of said parts having an identical part number and one or more programmable functions. The method comprises the steps of employing in a first product, a first of said parts; and employing in a second product, a second of said parts. Prior to normal operation of the first product, a first code is set in the first part, said first code causing said first part to provide a first programmable function during normal operation of the first product. Prior to normal operation of the second product, a second code is set in the second part, said second code causing the second part to provide a second programmable function during normal operation of the second product. The said second programmable function is different from the first programmable function. With a preferred embodiment, the first and second products are different computer servers and the parts are memory cards.

In the preferred embodiment, this invention alters the manufacturing system so that parts composed of common hardware but having unique microcode and VPD do not require unique Part Numbers. The invention minimizes the unique parts, those with a unique part numbers, which need to be managed as separate distinct entities and thus have additional overhead expenses associated with them such as inventory costs, engineering change control, scrap, field spares for replacement parts and other end-to-end costs associated with each individual unique part added to the system.

In the preferred embodiment of the invention, a single common part number is used. Each part may be personalized by the system in which it is installed for that system by loading a system unique microcode or VPD image. However, this innovative system does not require that a unique PN be stamped on the personalized part and thus it greatly simplifies the management process and helps reduce stocking costs, delays, and re-personalization work within manufacturing. In-system re-personalization of parts by the box manufacturer means the re-personalization is dynamic and the parts do not need to be sent back to the supplier. Field spares represent a significantly lower volume of parts compared with what is used in new system manufacture, and thus those parts are handled via system unique personalized parts to prevent the unauthorized purchase of lower cost common hardware and then activating additional functions only available at a higher price. The in-system personalization function is disabled once the system ships to a customer to prevent low priced common parts from being purchased and then re-personalized in the field to be used as higher function, higher priced parts.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
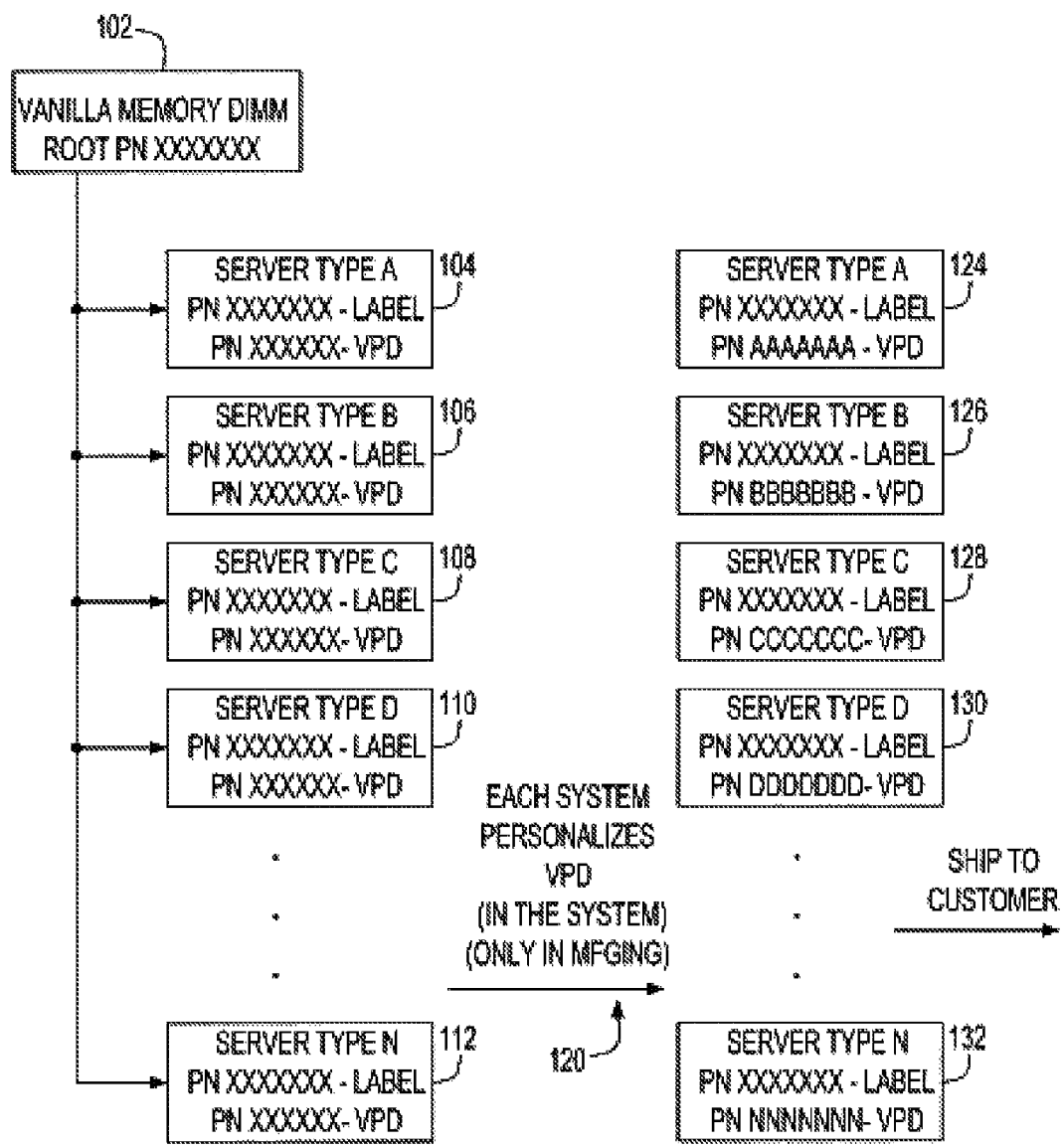
FIG. 1 illustrates an in-system personalization method embodying the present invention.

In accordance with the preferred embodiment of the present invention, in-system memory personalization in manufacturing is accomplished using common, or "vanilla," root Dual In-line Memory Modules (DIMM) and memory part numbers (PNs) ordered from the supplier. In FIG. 1, a vanilla root DIMM PN 102 (e.g. PN XXXXXXX) is ordered from the supplier. Only this root DIMM PN is stocked in manufacturing. There may be some minimum amount of Vital Product Data (VPD) on the root PN to identify it to the server as a part that is personalizable in this particular system. The servers, represented at 104, 106, 108, 110 and 112, are designed so VPD is written to DIMMs during manufacturing process, as represented at 120. The DIMMs are personalized with Field Replaceable Unit (FRU) PN characteristics during manufacture. The DIMMs in the servers, represented at 124, 126, 128, 130 and 132, shipped new from manufacturing retain the Root PN Label. The Root DIMM personalization can only occur via suitable personalization code in manufacturing.

Figure 2:
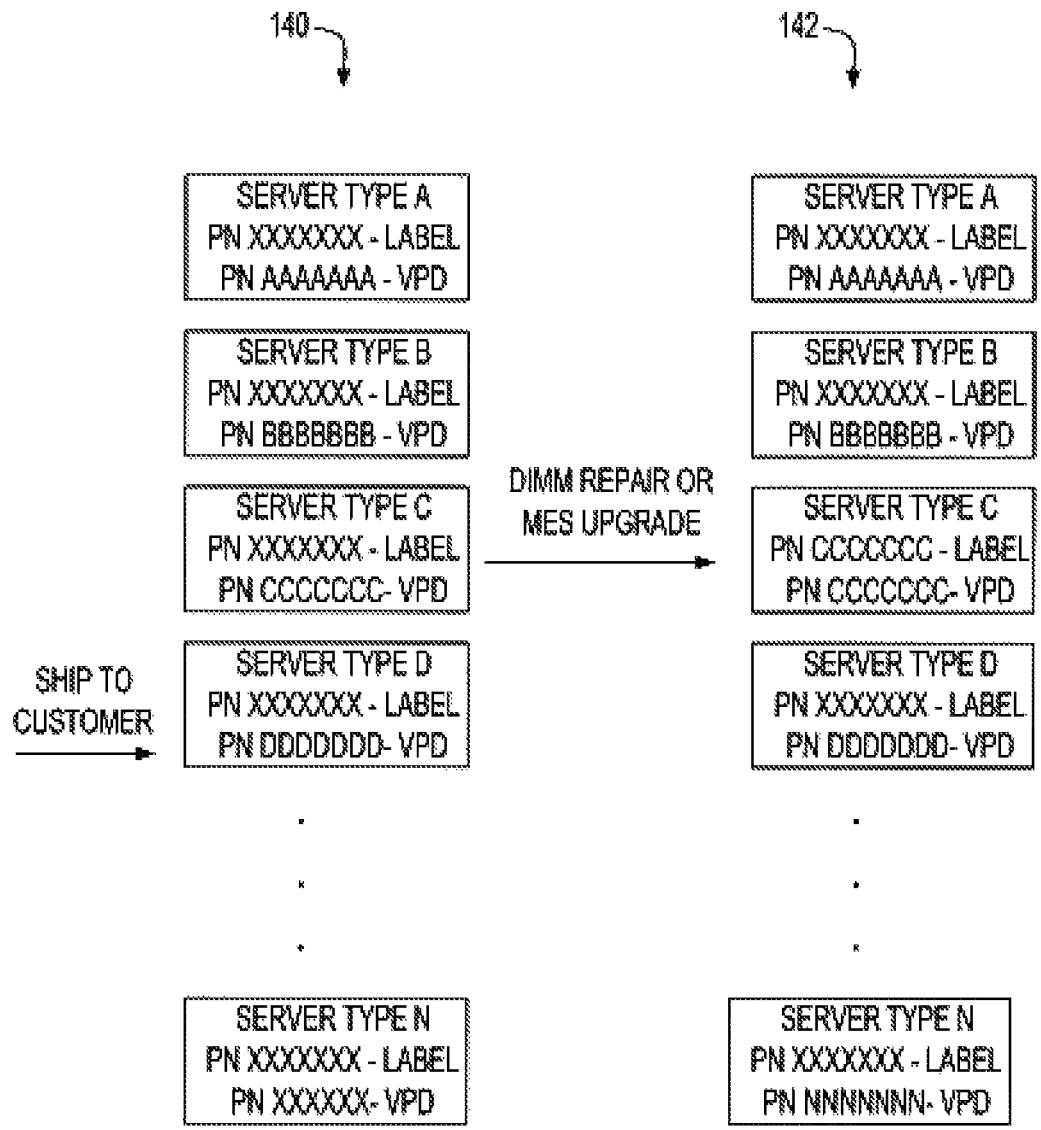
FIG. 2 shows how a replacement part may be obtained in accordance with the present invention.

In FIG. 2, it can be seen that Customer Engineers (CE) in the field, requiring a replacement part to repair a server, will order only pre-personalized FRU PNs for a DIMM repair scenario. Field Replaceable Units (FRUs) are the devices or subsystems that get replaced to repair a computer. In particular, FIG. 2 shows a group of servers at 140, each of which has a personalize DIMM, and these servers are shown at 142 after the personalized DIMMs have been replaced or upgraded.

The root DIMM PNs cannot be ordered directly from the supplier. A CE or customer pulls out the defective DIMM and finds the root PN Label. They contact the manufacturer, providing the root PN and the system for which it is installed. The manufacturer in turn sends a pre-personalized FRU DIMM PN as replacement. The manufacturer at the appropriate price point and functionality enabled personalizes the part for that system. Unpersonalized root DIMMs installed in systems in the field will not work. The personalization function where it could be specialized code or hardware internal to the computer or an external device that is not available outside of authorized Manufacturers. Root DIMMs personalized for a different system will not work if installed in the wrong system. Root DIMM personalization can only occur via suitable code in manufacturing. Only FRU DIMM PNs are used for MES order that part for the upgrade. The root DIMM PNs cannot be ordered directly from the manufacturer. The CE or Customer contacts the manufacturer to request MES memory upgrade. Again, the manufacturer in turn sends a pre-personalized FRU DIMM PN as replacement. The manufacturer at the appropriate price point and functionality enabled personalizes the part for that system. Unpersonalized root DIMMs installed in systems in the field will not work. Root DIMMs personalized for a different system will not work. Root DIMM personalization can only occur via suitable code in manufacturing.

Figure 3:
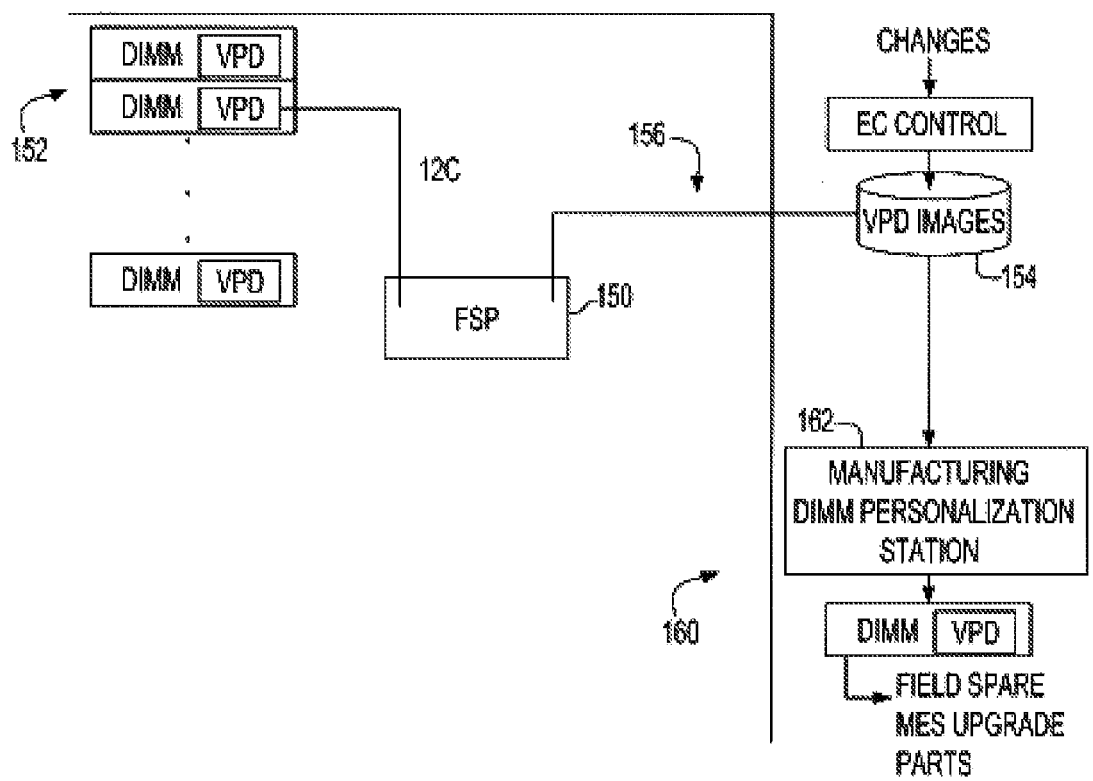
FIG. 3 shows one manifestation of in-system personalization in a manufacturing test cell.

FIG. 3 shows one manifestation of In-System personalization in a manufacturing test call. In many manufacturing facilities, the hardware hooks already exist to write VPD. In manufacturing, asset protection is turned off. During initial boot, the service processor 150 auto-personalizes DIMM 152 VPD for the Server in which it is installed. DIMMs preferably come from the supplier already personalized for the highest volume product. The personalization code recognizes if the VPD is already personalized for this server type and skips this step. The service processor 150 gets the VPD image for this server from a master file 154 on a network 156. Each DIMM is personalized quickly, normally less than a minute (in parallel with other initialization). The DIMM PN Label does not change to match personalization DIMMs. The DIMM PN in the VPD does not change to match personalized DIMMs. Asset Protection will use the feature number, not the PN. Asset Protection is turned back on after the In-System Auto-personalization completes. DIMMs can be taken out of this system and auto-personalized in different servers. There is no change needed for current Field Spares & MES Upgrades PNs handling. As represented at 160, Field Spares and MES upgrades can be personalized at a personalization station 162, which can obtain the appropriate VPD image from master file 154. The service processor personalization code is disabled before the server ships to the customer. The process is extendable to other FRU types (e.g., hard disk drives, adapter cards, planar boards, etc.).

A Service Processor is a separate computer processor, distinct from the main computational computer processor(s) used to by the computer customer applications and operating system, that provides maintenance and service functions for the system. The service processor may be external to the computer or imbedded within the computer. Service processors are at times implemented via multiple tier processors that interconnect to and communicate with each other where some are internal imbedded processors and other are external. Also, asset protection is a function that ensure only valid parts are used in a computer. If an invalid part is discovered, the system will be prevented from operating.

In-system personalization by the box manufacturer allows a large number of unique parts to be controlled and managed as a single part number. This significantly reduces overhead and end-to-end costs. The inventory of these common, vanilla parts being stocked is not dependent on the accuracy of a volume forecast for a single feature or machine type, but on the composite forecast of all features and machine types in which it is used. This significantly increases inventory turns, which decreases the total parts that need to be stocked, decreasing inventory expense and freeing capital. This also tends to make it much easier to fulfill orders, especially in end of month and end of quarter peak demand periods since inaccuracies in volume forecasts for specific machine types and feature forecasts tend to balance out across the various products. Some order quantities come in higher and some come in lower, so the aggregate demand tends to be much closer to forecast.

In-system personalization will also reduce scrap when a feature or machine type is discontinued since the common base hardware may be re-personalized and used in other machines.

In-system personalization Vs having individual suppliers personalize parts also increase the opportunity for parts reuse in (Equivalent To New) ETN and (Certified Spare Part) CSP programs where parts are returned from the field and reused in new machine or for replacement parts.

Figure 4:
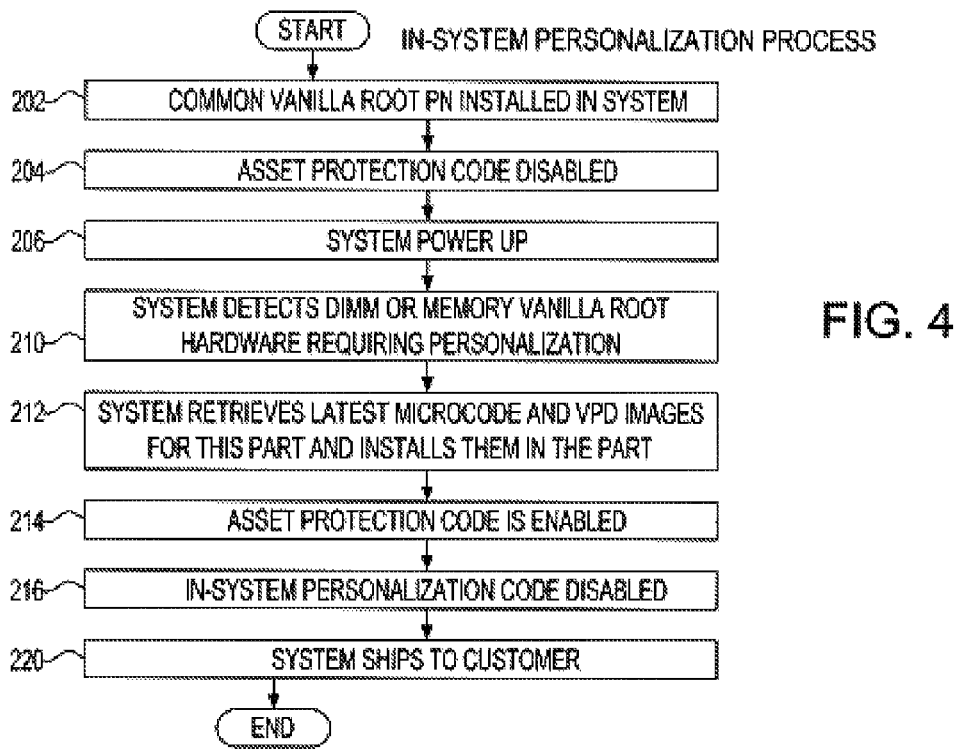
FIG. 4 is a flow chart of an in-system personalization process.
Figure 5:
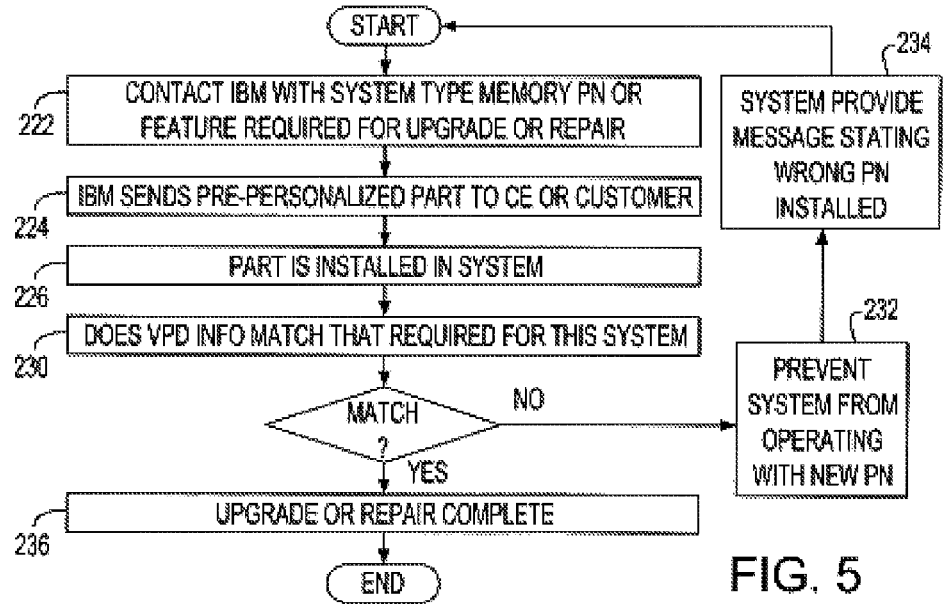
FIG. 5 is a flow chart of an in-system personalization repair/upgrade process.

FIG. 4 and FIG. 5 provide flow charts of in-system personalization and the repair/MES upgrade process.

With particular reference to FIG. 4, at step 202, a common vanilla root part number is installed on a server system; and at step 204, the asset protection code in the server system is disabled. At step 206, the server system is powered up; and at step 210, the server system detects the DIMM or memory hardware and determines whether personalization is required. If personalization is required, the server system, at step 212, retrieves the latest microcode and VPD images for this part and installs them in the part. Then, at step 214, the asset protection code in the server system is enabled; and at step 216, the in-system personalization code on the server system is disabled. At step 220, the server system is shipped to the customer.

With the upgrade and repairs procedure illustrated in FIG. 5, at step 222, the manufacturer is contacted and given the server system type and the memory part number or feature required for the upgrade or repair. At step 224, the manufacturer sends a pre-personalized part to the customer engineer or customer; and at step 226, this part is installed on the server system. At step 230, the server system then determines whether the VPD on the installed part is the VPD required for the server system.

If the VPD on the installed part does not match what is required, then at step 232, the server system is prevented from operating with this new part number; and at step 234, a message is provided indicating that the wrong part number was installed. The procedure then returns to the start and continues on from there.

If at step 230, the server system determines that the VPD on the installed part matches what is required for the server system, then at step 236, the upgrade or repair is completed. After this the procedure ends.

As will be readily apparent to those skilled in the art, the present invention, or aspects of the invention, can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective method described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method for personalizing a plurality of parts, all of said parts having an identical part number and one or more programmable functions, the method comprising the steps of:
a manufacturer manufacturing first and second products, the first product employing a first of said parts, and a second of the products employing a second of the parts, each of the first and second products including an in-system personalization function;
sending the first product to a first customer and sending the second product to a second customer;
prior to the step of sending the first product to the first customer, said manufacturer using the first product to determine if personalization of the first part is required for the first customer, and based on said personalization being required, using the personalization function of the first product to personalize the first part for the first customer by setting a first code in the first part, said first code causing said first part to provide a first programmable function, and said manufacturer disabling the personalization function of the first product, without disabling said first programmable function of the first part,
wherein the first customer is enabled to use the first programmable function of the first part without being able to use the personalization function of the first product to re-personalize said first part; and
prior to the step of sending the second product to the second customer, said manufacturer using the second product to determine if personalization of the second part is required for the second customer, and based on said personalization being required, using the personalization function of the second product to personalize the second part for the second customer by setting a second code in the second part, said second code causing the second part to provide a second programmable function, and said manufacturer disabling the personalization function of the second product, without disabling said second programmable function of the second part,
wherein the second customer is enabled to use the second programmable function of the second part without being able to use the personalization function of the second product to re-personalized said second part; and
wherein said second programmable function is different from the first programmable function and wherein:

each of said parts includes Vital Product Data (VPD) for identifying a system for which said each part is personalizable;
the first product is a computer server system; and
the manufacturer using the personalization function of the first product to personalize the first part includes:
installing the first part on the computer server system, said computer server system including asset protection code, disabling the asset protection code, using said VPD to identify a type of server for which said first part is personalizable,
determining if the first part is personalized for said type of server,
based on the first part not being personalized for said type of server, retrieving microcode and VPD images and installing the microcode and VPD images on the first part to personalize said first part for said type of server,
enabling the asset protection code, and
disabling the personalization function on said computer server system.

2. The method of claim 1 wherein the first and second parts are memory cards and the second products is a computer system.

3. The method of claim 1, wherein said first product is a first computer server and said second product is a second computer server, and wherein:
the step of the manufacturer using the personalization function of the first product includes using a defined feature of the first computer server to set the first code, and disabling said defined feature after setting the first code; and
the step of the manufacturer using the personalization function of the second product includes using a defined feature of the second computer server to set the second code, and disabling said defined feature of the second computer server after setting the second code.

4. The method of claim 1, wherein said first product is a first server and the second product is a second server, and the method comprises the further step of using a third server to set the first code in the first part and to set the second code in the second part.

5. The method according to claim 4, wherein:
the step of using the first product to determine if personalization of the first part is required includes the step of said manufacturer using said third server to set the first code, and
the step of using the second product to determine if personalization of the second part is required includes the step of the manufacturer using said third server to set the second code, and
the method comprises the further steps of said manufacturer, after setting the first code, installing the first part in the first product; and after setting the second code, installing the second part in the second product.

6. A system for personalizing a given supply of electronic modules, all of the given supply of electronic modules having the same part number and a plurality of programmable functions, and each of the modules being installed in one of a plurality of specified products, the system comprising:
a database of microcode for personalizing the electronic modules; and
a service processor including an in-system personalization function to determine, for each of the electronic modules, if microcode from the database is needed to personalize said each electronic module for the product in which the electronic module is installed, and based on the microcode is needed to personalize the electronic module, to identify the microcode needed for personalizing the electronic module for the product in which the electronic module is installed, to obtain said identified microcode from the database, and to install the obtained microcode on the electronic module to enable one or more of the programmable functions thereon without changing the part number of the electronic module, wherein the specified products are sent to customers from a manufacturer and the customers are enabled to use the programmable functions, without being able to use the in-system personalization function to re-personalize said each electronic module; and wherein:
each of said electronic modules includes Vital Product Data (VPD) for identifying a system for which said each electronic module is personalizable;
the specified products are computer servers; and
the service processor uses the in-system personalization function to personalize each of the electronic modules by:
installing said each electronic module on one of the computer servers, said one of the computer server systems including asset protection code,
disabling the asset protection code,
using said VPD of said each electronic module to identify a type of server for which said each electronic module is personalizable,
determining if said each electronic module is personalized for said type of server, and based on said each electronic module not being personalized for said type of server, retrieving microcode and VPD images and installing the microcode and VPD images on said each electronic module to personalize said each electronic module for said type of server,
enabling the asset protection code, and
disabling the in-system personalization function.

7. The system according to claim 6, wherein the service processor personalizes each of the electronic modules for use with a particular computer server.

8. The system according to claim 7, wherein the service processor identifies the particular computer server for which each electronic module is to be personalized.

9. The system according to claim 8, wherein each of the electronic modules includes data identifying one computer server, and the service processor uses said data to identify the particular computer server for which the module is to be personalized.

10. The system according to claim 9, wherein the service processor disables the asset protection code on each module before installing the microcode on said each module, and the service processor enables said asset protection code on each module after installing the microcode on said each module.

11. The system according to claim 10, wherein the electronic modules are memory cards, each of the memory cards has a non-volatile memory, and the service processor installs the obtained microcode on the non-volatile memory of each memory card.

12. A program storage device readable by machine, tangibly embodying a program of instructions executable by the machine to perform a method for personalizing a plurality of parts, all of said parts having an identical part number and one or more programmable functions, and wherein a manufacturer manufactures a first product employing a first of the parts, and a second product employing a second of the parts, the first product is sent to a first customer and the second product is sent to a second customer, the method comprising the steps of:

prior to the first product being sent to the first customer, the manufacturer using the first product to determine if personalization of the first part is required for the first customer, and based on said personalization being required, using the personalization function of the first product to personalize the first part for the first customer by setting a first code in the first part, said first code causing said first part to provide a first programmable function and disabling the personalization function of the first product, without disabling said one or more of the enabled programmable functions, wherein the first customer is enabled to use the first programmable function of the first part without being able to use the personalization function of the first product to re-personalize said first part; and before the second product is sent to the second customer, said manufacturer using the second product to determine if personalization of the second part is required for the second customer, and when said personalization is required, using the personalization function of the second product to personalize the second part for the second customer by setting a second code in the second part, said second code causing the second part to provide a second programmable function, and disabling the personalization function of the second product, without disabling said second programmable function of the second part, wherein the second customer is enabled to use the second programmable function without being able to use the personalization function of the second product to re-personalize said second part;

wherein said second programmable function is different from the first programmable function; and wherein:

each of said parts includes Vital Product Data (VPD) for identifying a system for which said each part is personalizable;

the first product is a computer server system; and the manufacturer using the personalization function of the first product to personalize the first part includes:

installing the first part on the computer server system, said computer server system including asset protection code, disabling the asset protection code using said VPD to identify a type of server for which said first part is personalizable, determining if the first part is personalized for said type of server, and based on the first part not being personalized for said type of server, retrieving microcode and VPD images and installing the microcode and VPD images on the first part to personalize said first part for said type of server, enabling the asset protection code, and disabling the personalization function on said computer server system.

13. The program storage device of claim 12, wherein the first and second products are computer systems, and the first and second parts are memory devices.

14. The program storage device of claim 13, wherein said first product is a first computer server and said second product is a second computer server, and wherein:

the step of setting the first code in the first part includes the steps of using a defined feature of the first computer server to set the first code, and disabling said defined feature after setting the first code; and the step of setting the second code on the second part includes the steps of using a defined feature of the second computer server to set the second code, and disabling said defined feature of the second computer server after setting the second code.

15. The program storage device of claim 12, wherein said first product is a first server and the second product is a second server, and the method comprises the further step of configuring a third server to set the first code in the first part and to set the second code in the second part.

16. A program storage device according to claim 12, wherein said plurality of parts are electronic modules and said method steps comprise the further step of configuring a service processor to identify, for each of the electronic modules, microcode for personalizing the electronic module, to obtain said identified microcode from a database, and to install the obtained microcode on the electronic module to enable one or more of the programmable functions thereon without changing the part number of the electronic module.

17. The program storage device according to claim 16, wherein each of the electronic modules includes data identifying one computer server, and the service processor uses said data to identify the particular server for which the module is to be personalized.

* * * * *